(12) United States Patent
Bernreiter et al.

(10) Patent No.: US 8,901,259 B2
(45) Date of Patent: Dec. 2, 2014

(54) PROPYLENE POLYMER COMPOSITION HAVING SUPERIOR HEXANE EXTRACTABLES/IMPACT BALANCE

(75) Inventors: Klaus Bernreiter, Linz (AT); Petar Doshev, Linz (AT); Gregory Potter, Linz (AT); Martina Sandholzer, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/704,089

(22) PCT Filed: Jun. 15, 2011

(86) PCT No.: PCT/EP2011/059899
§ 371 (c)(1),
(2), (4) Date: Jan. 8, 2013

(87) PCT Pub. No.: WO2011/157734
PCT Pub. Date: Dec. 22, 2011

(65) Prior Publication Data
US 2013/0253124 A1 Sep. 26, 2013

(30) Foreign Application Priority Data
Jun. 16, 2010 (EP) .................................. 10166089

(51) Int. Cl.
| | |
|---|---|
| *C08F 2/00* | (2006.01) |
| *C08F 210/00* | (2006.01) |
| *C08F 110/06* | (2006.01) |
| *C08L 19/00* | (2006.01) |
| *C08L 23/16* | (2006.01) |
| *C09D 119/00* | (2006.01) |
| *C08L 23/10* | (2006.01) |
| *C08L 23/12* | (2006.01) |
| *C09D 123/12* | (2006.01) |

(52) U.S. Cl.
CPC ................. *C08L 23/12* (2013.01); *C08L 19/00* (2013.01); *C08L 23/16* (2013.01); *C09D 119/00* (2013.01); *C08L 23/10* (2013.01); *C09D 123/12* (2013.01)
USPC ................. 526/64; 526/67; 526/89; 526/348; 526/351

(58) Field of Classification Search
USPC ................................. 526/64, 67, 89, 348, 351
See application file for complete search history.

(56) References Cited

U.S. PATENT DOCUMENTS 6,723,829 B1 * 4/2004 Malm et al. .................... 528/481

FOREIGN PATENT DOCUMENTS

| EP | 2182030 A1 | 5/2010 |
|---|---|---|
| WO | 2009077032 A1 | 6/2009 |
| WO | 2010040492 A2 | 4/2010 |

* cited by examiner

*Primary Examiner* — William Cheung
(74) *Attorney, Agent, or Firm* — Tarolli, Sundheim, Covell & Tummino LLP

(57) ABSTRACT

Heterophasic polypropylene copolymers having an MFR (2.16 kg, 230° C.) of 15 to 200 g/10 min, determined according to ISO 1133 comprising a propylene homo- or copolymer matrix with an MFR (2.16 kg, 230° C.) of 80 to 500 g/10 min, determined according to ISO 1133 (A) and an ethylene or $C_4$-$C_{10}$-alpha-olefin propylene rubber phase (B) dispersed within the matrix, wherein the heterophasic polypropylene resin has a fraction soluble in p-xylene at 25° C. (XCS), having an intrinsic viscosity of 2.85 to 4.00 dl/g, determined according to DIN EN ISO 1628-1 and -3 and being composed of propylene monomer units in an amount of 70 wt % to 90 wt %, with optimum balance of impact resistance and low amount of hexane extractables; a process for their preparation and their use.

8 Claims, No Drawings

PROPYLENE POLYMER COMPOSITION HAVING SUPERIOR HEXANE EXTRACTABLES/IMPACT BALANCE

RELATED APPLICATION

This application is a National Phase filing of PCT/EP2011/059899, filed Jun. 15, 2011, which claims priority from European Application No. 10166089.2, filed Jun. 16, 2010, the subject matter which are incorporated herein by reference in their entirety.

The present invention relates to heterophasic polypropylene copolymers with excellent balance of impact properties and low hexane extractables content. Furthermore, the present invention relates to a process for the production of such copolymers as well as to their use.

Heterophasic propylene copolymers are well established in a lot of applications, such as moulding applications, films, wires and cables or pipes, because of their good stiffness/impact ratio together with good flowability. For example heterophasic polymers are used for the production of car exteriors and interiors, in particular dashboards, door claddings, consoles, trims and the like as well as in the packaging area for food and medicals.

Heterophasic polymers are polymers having a matrix phase and a disperse phase. The matrix phase is usually a propylene homopolymer or copolymer phase and the disperse phase is often a propylene copolymer comprising ethylene and/or other higher α-olefin(s).

Many different types of heterophasic systems have been described depending on the individual desire.

From WO 2009/129873 heterophasic polypropylene copolymers with high purity, which is shown in reduced volatiles content, reduced fogging and reduced hexane-solubles content, are known. These high purity heterophasic polypropylene copolymers are prepared with a multi-step polymerisation procedure in the presence of a special Ziegler-Natta procatalyst which contains a trans-esterification product of a lower alcohol and a phthalic ester in combination with a special external donor.

EP 2 182 030 A1 describes heterophasic polypropylene compositions comprising a polypropylene matrix (M) and an elastomeric copolymer (E) being dispersed in the matrix (M), wherein the elastomeric copolymer (E) comprises units derived from propylene and ethylene and/or $C_4$-$C_{20}$-alpha-olefin, and wherein further, the intrinsic viscosity of the xylene cold soluble fraction (XCS) of the heterophasic polypropylene composition is above 2.1 dl/g measured according to ISO 1628-1 (at 135° C. in decaline) and/or the $MFR_2$ (230° C.) of the heterophasic polypropylene composition measured according to ISO 1133 is more than 25 g/10 min.

WO 2010/040492 describes a heterophasic polypropylene resin having an $MFR_2$ (2.16 kg, 230° C.) of more than 40 g/10 min, determined according to ISO 1133 comprising a propylene homo- or copolymer matrix (A) and an ethylene-propylene rubber phase (B) dispersed within the matrix,
wherein the heterophasic polypropylene resin has a fraction insoluble in p-xylene at 25° C. (XCU) with an intrinsic viscosity of 1.2 dl/g or less, determined according to DIN EN ISO 1628-1 and -3, the fraction insoluble in p-xylene at 25° C. (XCU) being composed of propylene monomer units in an amount of at least 95 wt.-%, and a fraction soluble in p-xylene at 25° C. (XCS), having an intrinsic viscosity of 2.0 to 3.5 dl/g, determined according to DIN EN ISO 1628-1 and -3 and being composed of propylene monomer units in an amount of 50 wt.-% or more, and having a glass transition temperature Tg as measured by DSC according to ISO 11357-2:1999 in the range of −42 to −30° C.

Although the composition according to WO 2010040492 shows good impact properties, the amount of hexane extractables is relatively high.

WO 2010/000792 further discloses a heterophasic propylene copolymer comprising the following components (A) a propylene polymer matrix (M) comprising a propylene homopolymer or a random copolymer of propylene and at least one further olefin different from propylene, said further olefin being present in up to 4.0 wt % relative to the total weight of the random copolymer, and (B) a rubber (R) comprising
(i) a first olefin, which is different from propylene, (ii) a second olefin, which is different from the first olefin, wherein the heterophasic propylene copolymer has a melt flow index in the range from 45 dg/min to 75 dg/min, measured according to ISO 1 133, condition L, 230° C., 2.16 kg, wherein the rubber has an intrinsic viscosity of at least 2.4 dl/g and of at most 4.5 dl/g, measured in tetralin at 135° C. following ISO 1628, and wherein the ratio of the intrinsic viscosities, measured in tetralin at 135° C. following ISO 1628, of the rubber (R) and the propylene polymer matrix (M) ηR/ηM is at least 3.5.

WO 2009/077032 describes a heterophasic polypropylene resin comprising a propylene homo- or copolymer matrix (A) and an ethylene-propylene rubber phase (B) dispersed within the matrix, wherein the heterophasic polypropylene resin has a fraction insoluble in p-xylene at 25° C. (XCU) with an intrinsic viscosity of 1.5 dl/g or less, determined according to DIN EN ISO 1628-1 and -3 and an amount of propylene monomer units of at least 95 mol %, and a fraction soluble in p-xylene at 25° C. (XCS) with an intrinsic viscosity of 1.5 to 3.0 dl/g, determined according to DIN EN ISO 1628-1 and -3, and an amount of propylene monomer units of 50 to 75 mol %, and a MFR (2.16 kg, 230° C.) of more than 100 g/10 min, determined according to ISO 1133.

The trend in product development for moulding applications is directed towards high flow materials with high stiffness and impact strength. However, certain regulations have to be fulfilled regarding the use of such materials in food contact applications.

Impact residence, even at low temperature, along with compliancy to food regulations in terms of hexane-solubles is a must in advanced packaging applications. FDA (CFR) §177.1520 regulates the use of olefin polymers in food contact materials. One important prerequisite to get the FDA approval is that the maximum extractable fraction in n-hexane ($C_6$-solubles or hexane extractables) must not exceed 6.4 wt % for PP-homopolymers, 5.5 wt % for PP-copolymers in non-cooking and 2.6 wt % for PP-copolymers in cooking applications.

Furthermore hexane-solubles are also undesirable in the field of medical packaging.

For these reasons, although much development work has been done in the field of heterophasic polypropylene copolymers there is a continuous need for alternative or improved heterophasic polypropylene copolymers, which fulfil the increasing environmental and customer requirements in many end application areas of polymer materials, such as packaging, including food and medical packaging, fibre, pipe and automobile industry. These heterophasic polypropylene copolymers shall show desirable properties, such as improved high purity, respectively reduced hexane-solubles content, while keeping the other properties needed for the production of moulded articles, like good stiffness/impact ratio together with good flowability.

It was therefore an object of the invention to provide heterophasic polypropylene copolymers having a balance of improved properties, e.g. having an optimum balance of impact resistance, even at low temperature, and low amount of hexane extractables.

The present invention is based on the finding that the above object can be achieved if a polypropylene homo- or copolymer matrix (A) is combined with a dispersed phase comprising an ethylene or $C_4$-$C_{10}$-alpha olefin-propylene copolymer with a high amount of propylene monomer units and a high intrinsic viscosity. The resulting heterophasic propylene copolymers show excellent impact properties even at low temperature as well as a low amount of hexane extractables.

Thus the present invention provides heterophasic polypropylene copolymers having an $MFR_2$ (2.16 kg, 230° C.) of 15 to 200 g/10 min, determined according to ISO 1133 comprising a propylene homo- or copolymer matrix (A) with an $MFR_2$ (2.16 kg, 230° C.) of 80 to 500 g/10 min, determined according to ISO 1133 and an ethylene or $C_4$-$C_{10}$-alpha-olefin propylene rubber phase (B) dispersed within the matrix,
wherein the heterophasic polypropylene copolymers have a fraction soluble in p-xylene at 25° C. (XCS), having an intrinsic viscosity of 2.85 to 4.00 dl/g, determined according to DIN EN ISO 1628-1 and -3 and being composed of propylene monomer units in an amount of 70 wt % to 90 wt %.

It has surprisingly been found that such heterophasic polypropylene copolymers show good impact properties even at low temperatures whereas the flexural properties are not affected. In addition the heterophasic polypropylene copolymers show low levels of hexane-solubles, thus fulfilling the FDA requirements for cooking applications. (hexane-solubles <2.6 wt %)

The propylene matrix (A) can be a propylene homopolymer, a propylene copolymer or mixtures thereof, like a homo/random copolymer. However, it is preferred that the propylene matrix (A) is a propylene homopolymer.

If the propylene matrix (A) is a propylene homopolymer, the matrix may consist of a single propylene homopolymer, but may also comprise a mixture of different propylene homopolymers.

The expression homopolymer used in the instant invention relates to a polypropylene that consists substantially, i.e. of at least 98 wt %, preferably of at least 99 wt %, more preferably of at least 99.5 wt %, still more preferably of at least 99.8 wt % of propylene units. In a preferred embodiment only propylene units in the propylene homopolymer are detectable. The comonomer content can be determined with FT infrared spectroscopy, as described below in the examples.

Where the propylene matrix (A) comprises a propylene copolymer or is a homo/random propylene copolymer, the propylene copolymer comprises monomers copolymerisable with propylene, for example comonomers such as ethylene and $C_4$-$C_{20}$-alpha-olefins, in particular ethylene and $C_4$-$C_{10}$-alpha-olefins, e.g. 1-butene or 1-hexene. The comonomer content in the propylene matrix is in such a case preferably relatively low, i.e. up to 6.0 wt %, more preferably 1.0 to 6.0 wt %, still more preferably 1.0 to 4.0 wt %, yet more preferably 1.0 to 3.0 wt %.

The propylene matrix (A) can be unimodal or multimodal, like bimodal. However it is preferred that the propylene matrix (A) is unimodal.

The expressions, "multimodal" or "bimodal" or "unimodal" used herein refer to the modality of the polymer, i.e. the form of its molecular weight distribution curve, which is the graph of the molecular weight fraction as a function of its molecular weight. As will be explained below, the polymer components of the present invention are produced in a sequential step process, using reactors in serial configuration and operating at different reaction conditions. As a consequence, each fraction prepared in a specific reactor will have its own molecular weight distribution. When the molecular weight distribution curves from these fractions are superimposed to obtain the molecular weight distribution of the final polymer, that curve may show two or more maxima or at least be distinctly broadened when compared with curves for the individual fractions.

When the matrix is unimodal with respect to the molecular weight distribution, it may be prepared in a single stage process e.g. as slurry or gas phase process in a slurry or gas phase reactor. Alternatively, the unimodal matrix may be produced in a multistage process using at each stage process conditions which result in similar polymer properties. Suitable multistage processes can comprise the combinations of a first slurry reactor and a second slurry reactor, a slurry reactor and a gas phase reactor and a first gas phase reactor and a second gas phase reactor.

Where the propylene matrix (A) comprises two or more different propylene polymers, these may be polymers made up with different monomers and/or with different molecular weight distributions. These components may have identical or differing monomer compositions and tacticities.

Moreover, it is preferred that the polymer matrix (A) has a rather high melt flow rate (MFR), i.e. a rather low molecular weight.

The melt flow rate measured under a load of 2.16 kg at 230° C. (ISO 1133) is denoted as $MFR_2$ (230° C.). Accordingly, it is preferred that in the present invention the propylene matrix (A) has an $MFR_2$ (230° C.) equal to or above 80 g/10 min. Preferably, the propylene matrix (A) has an $MFR_2$ (230° C.) equal to or above 90 g/10 min. The $MFR_2$ (230° C.) can be up to 500 g/10 min, preferably up to 400 g/10 min.

Thus, the $MFR_2$ of the polymer matrix (A) is in the range of 80 to 500 g/10 min, preferably 90 to 400 g/10 min.

The $M_w$ of the polymer matrix (A) is in the range of 80 to 150 kg/mol, preferably in the range of 90 to 140 kg/mol (determined with GPC).

As a further requirement of the heterophasic propylene copolymer, the ethylene or $C_4$-$C_{10}$-alpha-olefin propylene rubber phase (B), i.e. an elastomeric copolymer, must fulfill some properties so that the desired results can be achieved.

Accordingly, the ethylene or $C_4$-$C_{10}$-alpha-olefin propylene rubber phase (B) must comprise propylene and at least ethylene and/or one other $C_4$-$C_{10}$-alpha-olefin. Preferably, the ethylene or $C_4$-$C_{10}$-alpha-olefin propylene rubber phase (B) comprises, preferably consists of, propylene and at least one alpha-olefin comonomer selected from the group consisting of ethylene, 1-butene, 1-pentene, 1-hexene, 1-heptene and 1-octene. Preferably, the ethylene or $C_4$-$C_{10}$-alpha-olefin propylene rubber phase (B) comprises at least propylene and ethylene and may comprise a further alpha-olefin as defined in this paragraph. However, it is in particular preferred that the ethylene or $C_4$-$C_{10}$-alpha-olefin propylene rubber phase (B) comprises, more preferably consists of, propylene and ethylene as the only polymerisable units. Thus, an ethylene-propylene rubber (EPR) as ethylene or $C_4$-$C_{10}$-alpha-olefin propylene rubber phase (B) is most preferred.

Like the propylene matrix (A), the ethylene or $C_4$-$C_{10}$-alpha-olefin propylene rubber phase (B) can be unimodal or multimodal, like bimodal. However, it is preferred that the ethylene or $C_4$-$C_{10}$-alpha-olefin propylene rubber phase (B)

is unimodal. Concerning the definition of unimodal and multimodal, like bimodal, it is referred to the definition above.

It is preferred that the heterophasic propylene copolymer comprises:
a) 75 wt % to 95 wt %, more preferably 80 wt % to 93 wt % of the propylene matrix (A) based on the total amount of the heterophasic propylene copolymer and
b) 5 to 25 wt %, more preferably 7 to 20 wt % of the ethylene or $C_4$-$C_{10}$-alpha-olefin propylene rubber phase (B) based on the total amount of the heterophasic propylene copolymer.

Preferably the polypropylene matrix (A) and the ethylene or $C_4$-$C_{10}$-alpha-olefin propylene rubber phase (B) together contribute to at least 85 wt %, more preferably at least 90 wt %, and most preferably at least 95 wt %, to the heterophasic polypropylene composition. This applies in particular to cases where the heterophasic polypropylene composition comprises only the polypropylene matrix (A) and the ethylene or $C_4$-$C_{10}$-alpha-olefin propylene rubber phase (B) as polymer components. The remaining part may be additives, like antioxidants and/or nucleating agents. It is in particular preferred that the present heterophasic polypropylene composition may comprise alpha-nucleating agents, like talc, phosphorus based compounds (NA 11) and sorbitol derivatives.

Moreover, it is preferred that the $MFR_2$ (230° C.) of the heterophasic propylene copolymer is rather high, i.e. above or equal to 15 g/10 min, more preferably above or equal to 20 g/10 min.

Thus, the $MFR_2$ of the heterophasic propylene copolymer is in the range of 15 to 200 g/10 min, preferably in the range of 20 to 150 g/10 min.

The fraction soluble in p-xylene (XCS) is defined as the fraction of the polypropylene resin that is soluble in p-xylene at 25° C. The xylene cold soluble fraction (XCS) of the heterophasic polypropylene composition is dominated by the ethylene or $C_4$-$C_{10}$-alpha-olefin propylene rubber phase (B) (the xylene cold soluble fraction (XCS) of the polypropylene matrix (A) is not more than 5.0 wt %, preferably not more than 4.0 wt %, most preferably not more than 3.0 wt %).

The XCS fraction according to the invention has an amount of propylene monomer units of 70 to 90 wt %, preferably 73 to 85 wt %.

Accordingly, the amount of the other $C_2$-$C_{10}$ alpha-olefin(s), i.e. excluding propylene, in the xylene cold soluble fraction (XCS) of the heterophasic polypropylene composition, is 10 to 30 wt %, more preferably 15 to 27 wt %.

The mentioned comonomer values apply in particular in case an ethylene or $C_4$-$C_{10}$-alpha-olefin propylene rubber phase (B) is used in which ethylene as a comonomer is present. Preferably, the ethylene or $C_4$-$C_{10}$-alpha-olefin propylene rubber phase (B) is an ethylene-propylene rubber (EPR), in particular with propylene and/or an ethylene content as defined in this paragraph.

Further, the XCS fraction of the present invention has an intrinsic viscosity of 2.85 to 4.0 dl/g, preferably 2.90 to 3.50 dl/g, determined according to DIN EN ISO 1628-1 and -3. The XCS fraction is present in an amount of 5 to 25 wt %, preferably 7 to 20 wt %.

The $M_w$ of the XCS fraction is in the range of 350 to 730 kg/mol, preferably in the range of 360 to 680 kg/mol (determined with GPC).

The heterophasic polypropylene resin preferably shows excellent impact properties which can be seen in a high Charpy notched impact strength, determined according to ISO 179-1eA:2000. The inventive heterophasic polypropylene resin preferably has a Charpy notched impact strength at +23° C. of at least 4.0 kJ/m$^2$, more preferably at least 5.0 kJ/m$^2$ and still more preferably at least 6 kJ/m$^2$.

The upper limit of Charpy notched impact strength at +23° C. is 80 kJ/m$^2$, preferably 65 kJ/m$^2$. Further, the heterophasic polypropylene resin preferably has a Charpy notched impact strength at −20° C. of at least 2.0 kJ/m$^2$ and more preferably at least 3.0 kJ/m$^2$.

The upper limit of Charpy notched impact strength at −20° C. is 50 kJ/m$^2$, preferably 40 kJ/m$^2$. Moreover, the heterophasic polypropylene copolymers of the present invention have:
- a flexural modulus of at least 600 MPa, preferably at least 800 MPa, more preferably at least 1000 MPa, still more preferably at least 1200 MPa, up to 2500 MPa, preferably up to 2000 MPa, determined according to ISO 178;
- a fraction extractable in hexane (FDA (CFR) §177.1520) of less than 5.0 wt %, preferably less than 3.0 wt %, more preferably less than 2.6 wt %

As stated above, the heterophasic polypropylene composition may further comprise small amounts of additives known to those skilled in the art, e.g. stabilisers, acid scavengers, lubricants and mould release agents, fillers, nucleating agents, antistatics, plasticisers, dyes, pigments or flame retardants. In general, these are incorporated during granulation of the powdery product obtained in the polymerisation.

Stabilisers include antioxidants such as sterically hindered phenols, processing stabilisers such as phosphites or phosphonites, acid scavengers such as calcium stearate or zinc stearate or dihydrotalcite, sterically hindered amines or UV stabilizers.

In general, the heterophasic polypropylene composition of the present invention contains one or more stabilisers in amounts of up to 2 wt %.

Suitable lubricants and mould release agents are, for example, fatty acids, calcium or zinc salts of fatty acids, fatty acid amides or low molecular weight polyolefin waxes, which are usually used in concentrations of up to 2 wt %.

Possible fillers are, for example, talc, chalk or glass fibres, and these are usually used in amounts of up to 30 wt %, like 0.3 to 20 wt %.

Examples of suitable alpha-nucleating agents are inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyldibenzylidenesorbitol, ethyldibenzylidenesorbitol or dimethyldibenzylidenesorbitol or salts of diesters of phosphoric acid, e.g. sodium 2,2'-methylenebis(4,6,-di-tert-butylphenyl) phosphate.

According to the present invention the heterophasic propylene copolymer discussed above is produced in a multi-stage process, wherein the propylene matrix (A) is produced at least in one slurry reactor and subsequently the ethylene or $C_4$-$C_{10}$-alpha-olefin propylene rubber phase (B) is produced at least in one gas phase reactor.

Thus, the polymerisation system can comprise one or more conventional stirred slurry reactors and/or one or more gas phase reactors. Preferably, the reactors used are selected from the group of slurry and gas phase reactors and, in particular, the process employs at least one slurry reactor and at least one gas phase reactor. It is also possible to use several reactors of each type, e.g. one slurry and two or three gas phase reactors, or two slurry and one or two gas phase reactors, in series.

Preferably, the process comprises also a prepolymerisation with the chosen catalyst system, as described in detail below, comprising a Ziegler-Natta procatalyst, an external donor and optionally a cocatalyst.

In a preferred embodiment, the prepolymerisation is conducted as bulk slurry polymerisation in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 5 to 100 bar, for example 10 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerisation stages. Also in such cases it is necessary to introduce enough cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

The precise control of the prepolymerisation conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerisation in reaction medium that comprises at least 60 wt % monomer. According to a preferred embodiment the slurry reactor comprises a bulk loop reactor.

"Gas phase reactor" means any mechanically mixed or fluid bed reactor. Preferably, the gas phase reactor comprises a mechanically agitated fluid bed reactor with gas velocities of at least 0.2 m/sec.

The particularly preferred embodiment of the invention comprises carrying out the polymerisation in a process comprising either a combination of one slurry, like one loop and one to three gas phase reactors or a combination of two slurry, like two loop and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315 incorporated herein by reference.

A further suitable slurry-gas phase process is the Spheripol® process of Basell.

As a catalyst for the preparation of the heterophasic propylene copolymers preferably a Ziegler-Natta catalyst system is used. Such Ziegler-Natta catalyst systems are known in the art and comprise a catalyst component, a cocatalyst and an external donor. The catalyst component of the catalyst system primarily contains magnesium, titanium, halogen and an internal donor. Electron donors control the stereospecific properties and/or improve the activity of the catalyst system. A number of donors including ethers, esters, polysilanes, polysiloxanes and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds, titanium trichloride and titanium tetra chloride being particularly preferred Preferably, the heterophasic propylene copolymers with improved purity according to the invention are produced by using a special Ziegler-Natta procatalyst in combination with a external donor, as described below in detail, in the Spheripol® or in the Borstar®PP process. One preferred multistage process may therefore comprise the steps of:

producing a polypropylene polymer matrix (A) in the presence of the chosen catalyst system, as described in detail below, comprising a special Ziegler-Natta procatalyst (i), an external donor (iii) and optionally the cocatalyst (ii) in a first slurry reactor and optionally in a second slurry reactor or in a $1^{st}$ gas phase reactor (GPR), yielding a first polymerisation product, transferring the first polymerisation product into a $1^{st}$ GPR or a $2^{nd}$ GPR, if the matrix is produced in a slurry/GPR combination, producing an ethylene/propylene-copolymer in the polymer matrix in the presence of the catalyst system in said $1^{st}$ or $2^{nd}$ GPR optionally transferring the $1^{st}$ or $2^{nd}$ GPR product into a $2^{nd}$, respectively $3^{rd}$ GPR and producing a second ethylene/propylene-copolymer in the polymer matrix in the presence of the catalyst system in said $2^{nd}$ or $3^{rd}$ GPR, said $1^{st}$ and $2^{nd}$ ethylene/propylene mixtures may have the same or different composition ratios and recovering the polymer product for further processing.

One skilled in the art is aware of the various possibilities to produce heterophasic propylene copolymers and will simply find out a suitable procedure to produce suitable polymers which are used in the present invention.

With respect to the above-mentioned preferred slurry-gas phase process, the following general information can be provided with respect to the process conditions.

For slurry phase reactions, temperatures of from 40° C. to 110° C., preferably between 50° C. and 100° C., in particular between 60° C. and 90° C., with a pressure in the range of from 20 to 80 bar, preferably 30 to 60 bar, with the option of adding hydrogen in order to control the molecular weight in a manner known per se, are applicable.

In gas phase reactors, the temperature is preferably within the range of from 50° C. to 13° C., more preferably 60° C. to 100° C., at a pressure in the range of from 5 to 50 bar, preferably 8 to 35 bar, again with the option of adding hydrogen in order to control the molecular weight in a manner known per se.

The residence time can vary in the reactor zones identified above. In one embodiment, the residence time in the slurry reactor, for example a loop reactor, is in the range of from 0.5 to 5 hours, for example 0.5 to 2 hours, while the residence time in the gas phase reactor generally will be from 1 to 8 hours.

If desired, the polymerisation may be effected in a known manner under supercritical conditions in the slurry, preferably loop reactor, and/or as a condensed mode in the gas phase reactor.

According to the invention the heterophasic propylene copolymers are preferably obtained by a multistage polymerisation process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

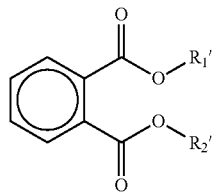

(I)

wherein $R_1'$ and $R_2'$ are independently at least a $C_5$-alkyl under conditions where a transesterification between said $C_1$ to $C_2$ alcohol and said dialkylphthalate of formula (I) takes place to form the internal donor c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanised carrier, followed by the steps of adding to said titanised carrier
(i) a dialkylphthalate of formula (I) with $R_1'$ and $R_2'$ being independently at least a $C_5$-alkyl, like at least a $C_8$-alkyl,
or preferably
(ii) a dialkylphthalate of formula (I) with $R_1'$ and $R_2'$ being the same and being at least a $C_5$-alkyl, like at least a $C_8$-alkyl
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product
subjecting said first product to suitable transesterification conditions, i.e. to a temperature between 100 to 150° C., such that said methanol or ethanol is transesterified with said ester groups of said dialkylphthalate of formula (I) to form preferably at least 80 mol-%, more preferably 90 mol-%, most preferably 95 mol-%, of a dialkylphthalate of formula (II)

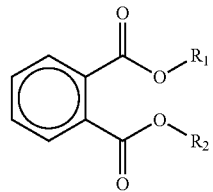

(II)

with $R_1$ and $R_2$ being methyl or ethyl, preferably ethyl, the dialkylphthalat of formula (II) being the internal donor and recovering said transesterification product as the procatalyst composition.

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

The transesterification is performed at a temperature above 100° C., advantageously between 130 to 150° C.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanisation is repeated after the above treatment in order to ensure a sufficient titanium concentration and thus activity.

Preferably the procatalyst used according to the invention contains 2.5% by weight of titanium at the most, preferably 2.2% by weight at the most and more preferably 2.0% by weight at the most. Its donor content is preferably between 4 to 12% by weight and more preferably between 6 and 10% by weight.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the a catalyst prepared according to WO92/19653 as disclosed in WO 99/24479; especially with the use of dioctylphthalate as dialkylphthalate of formula (I) according to WO 92/19658 or the catalyst Polytrack 8502, commercially available from Grace.

In a further embodiment, the Ziegler-Natta procatalyst can be modified by polymerising a vinyl compound in the presence of the catalyst system, comprising the special Ziegler-Natta procatalyst, an external donor and optionally a cocatalyst, which vinyl compound has the formula:

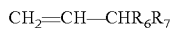

wherein $R_6$ and $R_7$ together form a 5- or 6-membered saturated, unsaturated or aromatic ring or independently represent an alkyl group comprising 1 to 4 carbon atoms, and the modified catalyst is used for the preparation of the polymer composition. The polymerised vinyl compound can act as a nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerisation reaction.

For the production of the heterophasic propylene copolymers according to the invention the catalyst system used preferably comprises in addition to the special Ziegler-Natta procatalyst an organometallic cocatalyst as component (ii). Accordingly it is preferred to select the cocatalyst from the group consisting of trialkylaluminium, like triethylaluminium (TEA), triisobutylaluminium, tri-n-butylaluminium; dialkyl aluminium chloride, like dimethyl- or diethyl aluminium chloride; and alkyl aluminium sesquichloride. More preferably, the cocatalyst is triethylaluminium or diethylaluminium chloride, most preferably triethylaluminium is used as cocatalyst.

Component (iii) of the catalysts system used is an external donor represented by formula (I) or (II)

$$Si(OCH_2CH_3)_3(NR^1R^2) \quad (I)$$

or

$$R^3{}_nR^4{}_mSi(OR^5)_z \quad (II)$$

wherein $R^1$ and $R^2$ can be the same or different and represent a hydrocarbon group having 1 to 12 carbon atoms,
$R^3$ and $R^4$ are identical or different hydrocarbon residues having 1 to 12 carbon atoms,
$R^5$ is methyl or ethyl,
Z is 2 or 3, preferably 2,
M is 0 or 1,
N is 0 or 1,
with the proviso that n+m+z=4.

$R^1$ and $R^2$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^1$ and $R^2$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. More preferably both $R^1$ and $R^2$ are the same and have 1 to 6 carbon atoms, yet more preferably both $R^1$ and $R^2$ are a $C_1$-$C_4$-alkyl group.

Most preferably, the external donor represented by the formula (I) is diethylaminotriethoxysilane.

Preferably, the external donor of formula (I) is diethylaminotriethoxysilane or cyclohexylmethyldimethoxysilane.

$R^3$ and $R^4$ are independently selected from the group consisting of linear aliphatic hydrocarbon group having 1 to 12 carbon atoms, branched aliphatic hydrocarbon group having 1 to 12 carbon atoms, cyclic aliphatic hydrocarbon group having 1 to 12 carbon atoms and aromatic group. It is in particular preferred that $R^3$ and $R^4$ are independently selected from the group consisting of methyl, ethyl, propyl, butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. In a preferred embodiment the external donor has the formula (III)

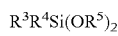

$$R^3R^4Si(OR^5)_2 \quad (IV)$$

wherein
$R^3$ and $R^4$ are identical or different hydrocarbon residues, with the proviso that
(a) $R^3$ is a branched aliphatic hydrocarbon group or cyclic aliphatic hydrocarbon group, preferably selected from the group consisting of iso-propyl, iso-pentyl, tert.-butyl, tert.-amyl, neopentyl, cyclopentyl, cyclohexyl, methylcyclopentyl and cycloheptyl, and
(b) $R^4$ is selected from the group consisting of linear aliphatic hydrocarbon group, branched aliphatic hydrocarbon group and cyclic aliphatic hydrocarbon group, preferably selected from the group consisting of methyl, ethyl, propyl, butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

Accordingly, it is preferred that the external donor of formula (II) or (III) is selected from the group consisting of di-iso-propyldiethoxysilane (DIPDES), cyclohexylmethyldiethoxysilane (CHMDES), dicyclopentyldimethoxysilane, cyclohexylmethyl-dimethoxysilane and dicyclopentadienyldiethoxysilane (DCPDES). More preferably, an external donor selected from dicyclopentyldimethoxysilane, cyclohexylmethyl-dimethoxysilane and di-iso-propyldiethoxysilane (DIPDES) is used and most preferably the cyclohexylmethyl-dimethoxysilane is used.

The copolymers of the invention may, as already stated above, further contain various conventional additives, such as miscible thermoplastics, stabilizers, acid scavengers, lubricants and mould release agents, fillers, nucleating agents, antistatics, plasticizers, dyes, pigments or flame retardants, etc. in an amount of 0.001 to 15 wt %, preferably up to 5.0 wt % and more preferably up to 3.0 wt % based on the weight of the heterophasic propylene copolymer.

Moulding resin formulations comprising the heterophasic propylene copolymers produced according to the invention may further comprise 0.3 to 20 wt % of one or more particulate of fibrous reinforcing fillers such as glass fiber or carbon fiber, graphite, carbon black or the like, or fillers such as clay, talc and mineral fillers and the like commonly employed in the trade for the manufacture of molded articles and extruded goods.

In the preferred embodiments, the additives are added to the heterophasic propylene copolymer, which is collected from the final reactor of the series of reactors. Preferably, these additives are mixed into the composition prior to or during the extrusion process in a one-step compounding process. Alternatively, a master batch may be formulated, wherein the heterophasic propylene copolymer is first mixed with only some of the additives.

For mixing, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection moulding to generate articles and products of the inventive heterophasic propylene copolymers.

Heterophasic propylene copolymers according to the invention may be pelletized and compounded using any of the variety of compounding and blending methods well known and commonly used in the resin compounding art.

The compositions of the current invention are preferably used for the production of moulded articles, preferably injection moulded articles or films. Even more preferred is the use for the production of thin wall packaging articles, household electrical materials and automotive applications, especially of car interiors and exteriors, in particular car interiors as for example dashboards, door claddings, consoles, trims and the like and for food and medical packaging or as one component for lamination and coating films.

The current invention also provides articles comprising the inventive heterophasic propylene copolymers. Preferably, these articles are produced by injection moulding.

Surprisingly, it was found that the moulded articles manufactured with the heterophasic propylene copolymer resins prepared according to the invention display improved purity.

It will be shown in the example section below that the polymer compositions according to the invention show lower amount hexane-solubles compared to other polymer compositions known from the state of the art. At the same time good impact properties, such as Charpy notched impact strength, especially at low temperatures are achieved whereas the flexural and tensile properties in behalf of flexural and tensile modulus are not affected.

In the following the present invention is further illustrated by means of examples.

Methods:

a) Melt Flow Rate

Unless otherwise specified, the melt flow rate was measured as the $MFR_2$ in accordance with ISO 1133 (230° C., 2.16 kg load) for polypropylene and is indicated in g/10 min. The MFR is an indication of the flowability, and hence the processability, of the polymer. The higher the melt flow rate, the lower the viscosity of the polymer.

b) Comonomer Content was measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —$CH_2$-absorption peak (800-650 $cm^{-1}$) was measured with Perkin Elmer FTIR 1600 spectrometer. The method was calibrated by ethylene content data measured by $^{13}$C-NMR.

c) Flexural Modulus was measured according to ISO 178 by using injection molded test specimens as described in EN ISO 1873-2 (80×10×4 mm)

d) Xylene Solubles

The xylene soluble fraction (XS) as defined and described in the present invention was determined as follows: 2.0 g of the polymer were dissolved in 250 mm p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 mm flasks. The solution from the first 100 mm vessel was evaporated in nitrogen flow and the residue dried under vacuum at 90° C. until constant weight is reached. The xylene soluble fraction (percent) can then be determined as follows:

$$XS \% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter).

e) Intrinsic Viscosity (IV)

The intrinsic viscosity (IV) value increases with the molecular weight of a polymer. The IV values of the amorphous phase were measured according to ISO 1628-1 and -3 in Decalin at 135° C.

f) Charpy Notched Impact Strength (NIS),

NIS was determined according to ISO 179-1eA:2000 on V-notched samples of 80×10×4 $mm^3$ at 23° C. (Charpy notched impact strength (23° C.)), and −20° C. (Charpy notched impact strength (−20° C.)). The test specimens were prepared by injection moulding in line with ISO 1872-2. The melt temperature was 200° C. and the mold temperature was 40° C.

k) Hexane-Solubles (Wt %)

The content of hexane-solubles was determined according to FDA CFR 21 §177.1520. Procedure: 1 g sample of a polymer film of 100 μm thickness (produced on a PM30 cast film line using chill-roll temperature of 40° C.) was extracted at 50° C. in 400 ml n-hexane for 2 hours and then filtered on a filter paper N° 41. The filtrate was then evaporated and the total residue weighed as a measure of the n-hexane extractable fraction.

EXAMPLE 1 (INVENTIVE) AND COMPARATIVE EXAMPLES CE1, CE2, CE3, and CE4

The Base resins were produced in a 2 l1 autoclave. The catalyst used in the polymerisation was prepared according to WO 92/19653 with DOP as dialkylphthalate of the formula (I) and ethanol as alcohol, the cocatalyst was Triethylaluminium (TEA) and as an external donor (D) cyclohexylmethyl-dimethoxysilane was used.

After a first pre-polymerisation step the reactor was heated up to 85° C. and filled with the desired amount of $C_3$ and $H_2$ to initiate bulk conditions. The pressure of the reactor was kept constant by feeding $C_3$. After the specified bulk residence time the reactor was flashed and the production of homopolymer matrix was continued using gas phase conditions. After the specified GP1 residence time the reactor was again flashed. In a third stage the elastomeric rubber disperse phase was produced by copolymerisation of propylene with ethylene comonomer using the specified gas phase conditions.

According to comparative Example 1 (CE1) an iPP is produced only with prepolymerisation step and subsequent polymerisation of the polypropylene homopolymer in the bulk phase and a subsequent gas phase.

Comparative Examples 2 and 3 (CE2 and CE3) were produced like the inventive Example 1. Comparative Example 4 (CE4) corresponds to Example 2 of WO 2009/129873.

TABLE 1

Reaction conditions for Example 1, CE1, CE2 and CE3:

|  | EXAMPLE 1 | CE1 | CE2 | CE3 |
|---|---|---|---|---|
| 1) Prepolymerisation |  |  |  |  |
| T [° C.] | 23 | 23 | 23 | 23 |
| TEA/D [mol/mol] | 6 | 6 | 6 | 6 |
| Residence time [min] | 6 | 6 | 6 | 6 |
| 2) Bulk phase |  |  |  |  |
| T [° C.] | 85 | 85 | 85 | 85 |
| Pressure [bar] | 54 | 54 | 54 | 54 |
| Residence time [min] | 30 | 30 | 30 | 30 |
| $H_2/C_3$ [mol/kmol] | 47 | 47 | 47 | 47 |
| 3) $1^{st}$ Gas phase reactor |  |  |  |  |
| T [° C.] | 85 | 85 | 85 | 85 |
| Pressure [bar] | 28 | 28 | 28 | 28 |
| $H_2/C_3$ [mol/kmol] | 194 | 194 | 194 | 194 |
| $MFR_2$[g/10 min] | 100 | 100 | 100 | 100 |
| Residence time [min] | 80 | 80 | 80 | 80 |
| 4) 2nd Gas phase reactor |  |  |  |  |
| T [° C.] | 85 | — | 85 | 85 |
| Pressure [bar] | 21 | — | 21 | 21 |
| Split bulk: $1^{st}$ GPR [%] | 60:40 | 60:40 | 60:40 | 60:40 |

TABLE 2

Compositions

| | EXAMPLE 1 | CE1 | CE2 | CE3 | CE4 |
|---|---|---|---|---|---|
| XCS [wt %] | 15 | 1.0 | 4.5 | 16.5 | 13.4 |
| $C_2$ (XCS) [wt %] | 24.6 | 0 | 24.3 | 36.9 | 34.0 |
| $C_2$ (total) [wt %] | 3.7 | 0 | 0.9 | 6.5 | 7.1 |
| $C_3$/EPR [wt %] | 75.4 | 0 | 75.7 | 63.6 | 66 |
| iV/(XCS) [dl/g] | 2.92 | 1.15 (overall*) | 0.7 | 3.09 | 2.27 |
| $MFR_2$ final [g/10 min] | 46 | 97 | 113 | 45 | 43 |

*Since in comparative Example 1 (CE1) an iPP is produced only with prepolymerisation step, followed by polymerisation of the polypropylene homopolymer in the bulk phase and a subsequent gas phase, there is no iV-value for a rubber phase and the iV-value represents the overall value for the iPP.

Testing of Base and Comparative Resins

Base resins of Example 1, CE1, CE2 and CE3 were initially obtained in powder form.

The base resins mixed with 0.5 [wt %] talc A3 (from Luzenac (Naintsch)), 0.05 [wt %] SHT (synthetic hydrotalcite; DHT-4A from Kyowa), 0.25 [wt %] Irganox B225 (Ciba Speciality Chemicals, antioxidant), and 0.05 [wt %] Ca-stearate.

The Composition of CE4 was mixed with 0.5 [wt %] talc A3 (from Luzenac (Naintsch)), 0.1 [wt %] Irganox B215 (Ciba Speciality Chemicals, antioxidant), and 0.05 [wt %] Ca-stearate according to the Examples of WO 2009/129873

The mixtures were compounded by feeding the components to a Prism 24twin-screw extruder (Prism Ltd., Staffordshire, UK). The material was then extruded through a strand die, cooled and chopped to form pellets.

TABLE 3

Properties of compounded resins

| | Example 1 | CE1 | CE2 | CE3 | CE4 |
|---|---|---|---|---|---|
| HEX [wt %] | 2.0 | 0.8 | 2.7 | 4.9 | 3.1 |
| Flex. Mod [MPa] | 1300 | 2040 | 1740 | 1360 | 1384 |
| Charpy +23° C. [kJ/m²] | 6.7 | 1.7 | 1.7 | 6.8 | 6.2 |
| Charpy −20° C. [kJ/m²] | 3.1 | 1.4 | 1.0 | 3.1 | 2.8 |

HEX hexane extractables

As can be seen from Table 2 the inventive heterophasic polypropylene copolymer exhibited exceptionally low hexane extractables (2.0 wt %) while maintaining a good stiffness (1300 MPa)/impact (NIS 23° C.: 6.7 kJ/m²; NIS −20° C.: 3.1 kJ/m²) balance. The performance of iPP is illustrated in comparative example 1. Comparative example 1 exhibited high flowability ($MFR_2$: 94 g/10 min) along with high stiffness and low hexane extractables. The desired impact performance could not however, be achieved with the homopolymer-design. Comparative example 2 was designed to have a similar $C_2$(XCS) as the inventive example while exhibiting a lower molecular weight of the elastomeric phase. This design resulted in a higher flowability and stiffness with similar hexane extractables. However, an impact performance similar to example 1 was not attainable. Comparative example 3 exhibited similar mechanical properties as the inventive example 1; but with hexane extractables which are twice as high as the inventive heterophasic polypropylene copolymer.

Comparative example 4, which corresponds to Example 2 of WO 2009/129873 exhibited similar mechanical properties as the inventive example 1 with slightly worse impact properties. The hexane extractables lie above the 2.6 wt % limit which is required for cooking applications according to FDA.

The invention claimed is:

1. Process for the preparation of heterophasic polypropylene copolymers comprising the steps of:
   producing a polypropylene polymer matrix (A) in the presence of a catalyst system in a first slurry reactor and optionally in a second slurry reactor or in a $1^{st}$ gas phase reactor (GPR), yielding a first polymerisation product, wherein the catalyst system comprises:
   i) a Ziegler-Natta procatalyst which contains a trans-esterification product of a lower alcohol and a phthalic ester;
   (ii) optionally an organometallic cocatalyst; and
   (iii) an external donor represented by formula (I) or (II)

   $$Si(OCH_2CH_3)_3(NR^1R^2) \qquad (I)$$

or

   $$R^3{}_nR^4{}_mSi(OR^5)_z \qquad (II)$$

wherein $R^1$ and $R^2$ can be the same or different and represent a hydrocarbon group having 1 to 12 carbon atoms,
   $R^3$ and $R^4$ are identical or different hydrocarbon residues having 1 to 12 carbon atoms,
   $R^5$ is methyl or ethyl,
   z is 2 or 3
   m is 0 or 1
   n is 0 or 1
   with the proviso that n+m+z=4;
   transferring the first polymerisation product into a $1^{st}$ GPR or a $2^{nd}$ GPR, if the matrix is produced in a slurry/GPR combination;
   producing an ethylene/propylene-copolymer in the polymer matrix in the presence of the catalyst system in said $1^{st}$ or $2^{nd}$ GPR;
   optionally transferring the $1^{st}$ or $2^{nd}$ GPR product into a $2^{nd}$ respectively $3^{rd}$ GPR and producing a second ethylene/propylene-copolymer in the polymer matrix in the presence of the catalyst system in said $2^{nd}$ or $3^{rd}$ GPR, said $1^{st}$ and $2^{nd}$ ethylene/propylene mixtures may have the same or different composition ratios; and
   recovering the polymer product for further processing, the recovered polymer product including heterophasic polypropylene copolymers having an $MFR_2$ (2.16 kg, 230° C.) of 15 to 200 g/10 min, determined according to ISO 1133 comprising a propylene homo- or copolymer matrix (A) with an $MFR_2$ (2.16 kg, 230° C.) of 80 to 500 g/10 min, determined according to ISO 1133 and an ethylene or $C_4$-$C_{10}$-alpha-olefin propylene rubber phase (B) dispersed within the matrix,
   wherein the heterophasic polypropylene copolymers have a fraction soluble in p-xylene at 25° C. (XCS), having an intrinsic viscosity of 2.85 to 4.00 dl/g, determined according to DIN EN ISO 1628-1 and -3 and being composed of propylene monomer units in an amount of 70 wt % to 90 wt %.

2. The process of claim 1, wherein the propylene matrix (A) is a propylene homopolymer with an $MFR_2$ (2.16 kg, 230° C.) of 90 to 400 g/10 min, determined according to ISO 1133 (A).

3. The process of claim 1, wherein the rubber phase (B) is an ethylene/propylene copolymer.

4. The process of claim 1, wherein the heterophasic polypropylene copolymers comprise:
   a) 75 wt % to 95 wt % of the propylene matrix (A) based on the total amount of the heterophasic propylene copolymer and
   b) 5 to 25 wt % of the ethylene or $C_4$-$C_{10}$-alpha-olefin propylene rubber phase (B) based on the total amount of the heterophasic propylene copolymer.

5. The process of claim 1 further comprising providing the heterophasic copolymers in a heterophasic polypropylene composition, wherein the propylene matrix (A) and the ethylene or $C_4$-$C_{10}$-alpha-olefin propylene rubber phase (B) contribute to at least 85 wt % to the composition and up to 15 wt % may be on or more additives selected from the group consisting of alpha-nucleating agents, antioxidants, stabilizers, acid scavengers, lubricants, mould release agents, flame retardants, pigments, dyes, fillers and plasticizers.

6. The process of claim 5, wherein the composition has a Charpy notched impact strength at +23° C. of at least 4.0 kJ/m$^2$, up to 80 kJ/m$^2$, and a Charpy notched impact strength at −20° C. of at least 2.0 kJ/m$^2$ up to 50 kJ/m$^2$, determined according to ISO 179-1eA:2000.

7. The process of claim 5, wherein the composition has a flexural modulus of at least 600 MPa up to 2500 MPa determined according to ISO 178.

8. The process of claim 5, wherein the composition has a fraction extractable in hexane (FDA 177, 1520) of less than 5.0 wt %.

* * * * *